United States Patent
Kennedy et al.

(10) Patent No.: US 7,388,065 B2
(45) Date of Patent: Jun. 17, 2008

(54) PROCESS FOR PREPARING SILOXANE COMPOUNDS

(75) Inventors: Jospeh P. Kennedy, Akron, OH (US); Jeremy L. Daum, Lexington, KY (US)

(73) Assignee: The University of Akron, Akron, OH (US)

( * ) Notice: Subject to any disclaimer, the term of this patent is extended or adjusted under 35 U.S.C. 154(b) by 377 days.

(21) Appl. No.: 11/291,319

(22) Filed: Dec. 1, 2005

(65) Prior Publication Data

US 2006/0128922 A1    Jun. 15, 2006

Related U.S. Application Data

(60) Provisional application No. 60/632,143, filed on Dec. 1, 2004.

(51) Int. Cl.
C08G 77/00 (2006.01)
C08G 77/04 (2006.01)

(52) U.S. Cl. .............................. 528/37; 528/10; 528/33

(58) Field of Classification Search .................. 528/10, 528/25, 31, 37
See application file for complete search history.

(56) References Cited

U.S. PATENT DOCUMENTS

| | | | |
|---|---|---|---|
| 2,762,827 A | 3/1957 | Johannson | |
| 2,785,147 A | 3/1957 | Kantor | |
| 2,793,222 A | 5/1957 | Kantor et al. | |
| 2006/0041098 A1* | 2/2006 | Kennedy et al. | 528/25 |
| 2006/0074212 A1* | 4/2006 | Chapman et al. | 528/15 |
| 2006/0111491 A1* | 5/2006 | Asch et al. | 524/261 |

* cited by examiner

*Primary Examiner*—Randy Gulakowski
*Assistant Examiner*—Robert Loewe
(74) *Attorney, Agent, or Firm*—Roetzel & Andress; George W. Moxon, II

(57) ABSTRACT

In one embodiment, the present invention relates to a process for preparing siloxane polymers comprising the steps of: (a) polymerizing at least one siloxane-based monomer in the presence of a crosslinking agent consistent with the following structure:

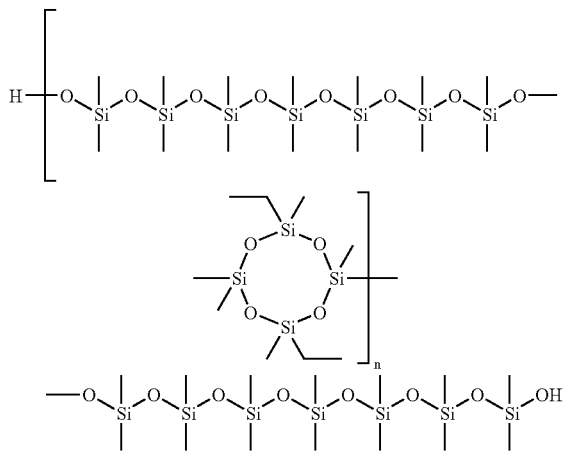

where n is an integer in the range of 1 to about 100; and (b) recovering at least one polymerization product generated by the reaction of Step (a).

23 Claims, 4 Drawing Sheets

PROCESS FOR PREPARING SILOXANE COMPOUNDS

RELATED APPLICATION DATA

This application claims priority to previously filed U.S. Provisional Application No. 60/632,143 filed on Dec. 1, 2004, entitled "A Novel Process for Curing Siloxane Rubbers", and is hereby incorporated by reference in its entirety.

FIELD OF THE INVENTION

The present invention relates to processes for preparing siloxane compounds (e.g., siloxane rubbers), and products made by such processes.

BACKGROUND OF THE INVENTION

Siloxane-based rubbers such as polydimethylsiloxane (PDMS) are important commercial commodities. PDMS rubbers are commonly produced by the polymerization of cyclic siloxanes in the presence of a base catalyst, in bulk, at elevated temperatures followed by curing of the linear prepolymer. Some examples of such cyclic siloxanes are hexamethylcyclotrisiloxane (D3), octamethylcyclotetrasiloxane (D4), decamethylcyclopentasiloxane (D5), and the like.

Initiation of D4 polymerization by a base (B in FIGS. 1 and 2, e.g., —OH, —OR) to the PDMS prepolymer proceeds by the reaction scheme represented in FIG. 1. Propagation is by repetitive ring opening steps in equilibrium with cyclization, as shown in FIG. 2. This process yields a mixture of linear and cyclic products. The cyclics are removed and recycled. Useful articles are prepared from the linear products by crosslinking. Crosslinking to desirable rubbers may proceed by various techniques, i.e., by the use of peroxides, high-energy radiation, hydrosilation, condensation, and the like.

SUMMARY OF THE INVENTION

In one embodiment, the present invention provides a process for preparing siloxane compounds (e.g., siloxane rubbers). In another embodiment, the present invention provides compounds made by the curing processes disclosed herein. In still another embodiment, the present invention relates to a process for curing siloxane polymers comprising the steps of polymerizing siloxane-based monomers in the presence of Crosslinking Agent "A" having the structure shown below:

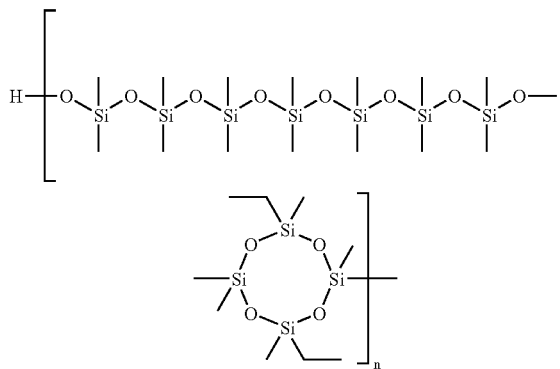

-continued

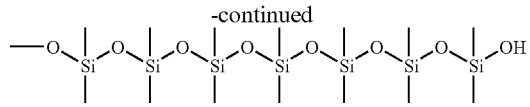

where n is an integer in the range of 1 to about 100. In another embodiment, n is an integer in the range of about 5 to about 75, or from about 10 to about 50, or from about 20 to about 40, or even from about 25 to about 35. Additionally, it should be noted that here, as well as elsewhere in the text, ranges may be combined.

In still another embodiment, the present invention relates to a process for preparing siloxane polymers comprising the steps of polymerizing at least one siloxane-based monomer in the presence of Crosslinking Agent "A", where the one or more monomers are chosen from monomers consistent with Formulas (I) through (IV) shown below.

| | |
|---|---|
| $R^1R^2R^3R^4R^5R^6$-cyclotrisiloxane | (I) |
| $R^1R^2R^3R^4R^5R^6R^7R^8$-cyclotetrasiloxane | (II) |
| $R^1R^2R^3R^4R^5R^6R^7R^8R^9R^{10}$-cyclopentasiloxane | (III) |
| $R^1R^2R^3R^4R^5R^6R^7R^8R^9R^{10}R^{11}R^{12}$-cyclohexasiloxane | (IV) | wherein $R^1$ through $R^{12}$ are independently selected from methyl, ethyl, propyl, butyl, pentyl, and phenyl. In another embodiment, each "R'''' " can represent a variable substituent of the silicon atoms involved in the cyclosiloxanes indicated in each formula. Any "R'''' " group may be bonded to any silicon atom of the cyclosiloxane ring. Each silicon atom of such ring has two "R'''' " groups. Therefore the number of "R'''' " groups is always twice the number of silicon atoms in such ring. Accordingly, cyclotrisiloxane has six "R'''' " groups $R^1$ through $R^6$ as is shown above in Formula (I). Further, each "R'''' " is independently chosen from among the six possibilities: methyl, ethyl, propyl, butyl, pentyl, and phenyl.

In still another embodiment, the present invention relates to a process for preparing siloxane polymers comprising the steps of polymerizing at least one siloxane-based monomer in the presence of Crosslinking Agent "A", where the amount of Crosslinking Agent "A" used in the polymerization reaction is greater than 0% by weight to less than about 100% by weight.

In still another embodiment, the present invention relates to a process for preparing siloxane polymers comprising the steps of polymerizing at least one siloxane-based monomer in the presence of Crosslinking Agent "A", where the amount of monomer used in the polymerization reaction is greater than 0% by weight to less than about 100% by weight.

In still another embodiment, the present invention relates to a process for curing the siloxane polymers produced by the methods disclosed herein.

In still another embodiment, the present invention relates to a process for preparing siloxane polymers comprising the steps of: (a) polymerizing at least one siloxane-based monomer in the presence of a crosslinking agent consistent with the following structure:

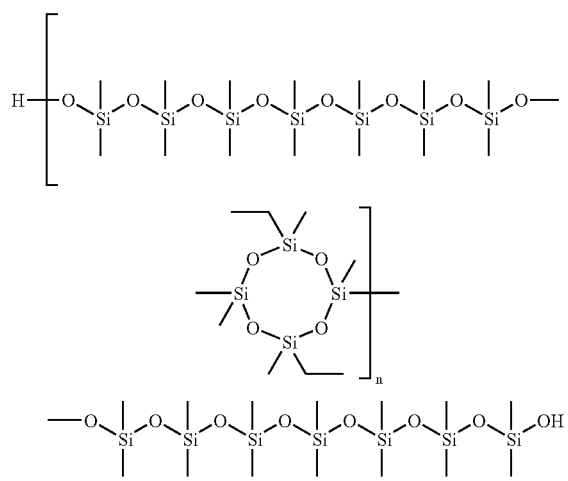

where n is an integer in the range of 1 to about 100; and (b) recovering at least one polymerization product generated by the reaction of Step (a).

In still another embodiment, the present invention relates to a process for preparing siloxane polymers comprising the steps of: (a) polymerizing at least one siloxane-based monomer in the presence of a crosslinking agent consistent with the following structure:

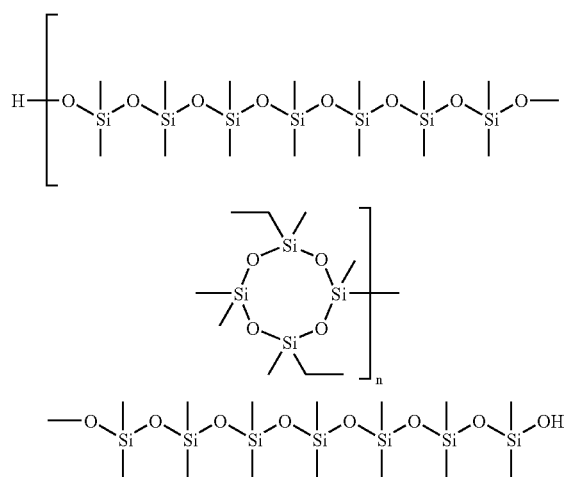

where n is an integer in the range of 1 to about 100, and at least one transient base, wherein the at least one monomer is octamethylcyclotetrasiloxane and the at least one transient base is tetramethylammonium hydroxide; and (b) recovering at least one polymerization product generated by the reaction of Step (a).

In still another embodiment, the present invention relates to a process for preparing siloxane polymers comprising the steps of: (a) polymerizing at least one siloxane-based monomer in the presence of a crosslinking agent consistent with the following structure:

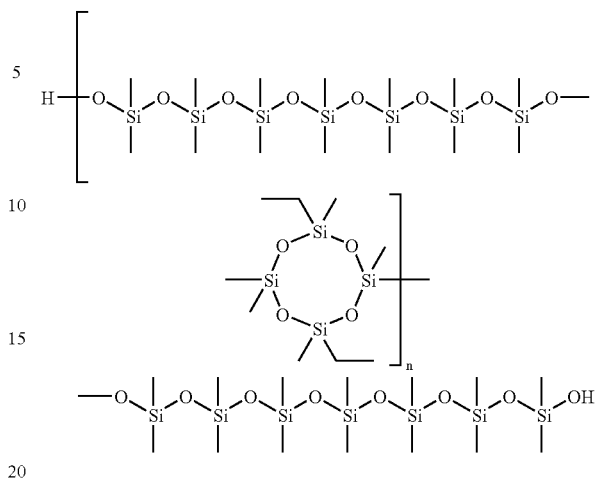

where n is an integer in the range of 1 to about 100, and at least one transient base, wherein the at least one monomer is selected from one or more monomers having a structure consistent with one of the formulas shown below:

$R^1R^2R^3R^4R^5R^6$-cyclotrisiloxane (I)

$R^1R^2R^3R^4R^5R^6R^7R^8$-cyclotetrasiloxane (II)

$R^1R^2R^3R^4R^5R^6R^7R^8R^9R^{10}$-cyclopentasiloxane (III)

$R^1R^2R^3R^4R^5R^6R^7R^8R^9R^{10}R^{11}R^{12}$-cyclohexasiloxane (IV)

wherein $R^1$ through $R^{12}$ are independently selected from methyl, ethyl, propyl, butyl, pentyl, and phenyl; and (b) recovering at least one polymerization product generated by the reaction of Step (a).

DETAILED DESCRIPTION OF THE INVENTION

The present invention relates to processes for preparing and/or curing siloxane compounds (e.g., siloxane rubbers), and products made by such processes. In one embodiment, the present invention is directed to a new process for the preparation of new and useful PDMS-based rubbers.

Figure 3:
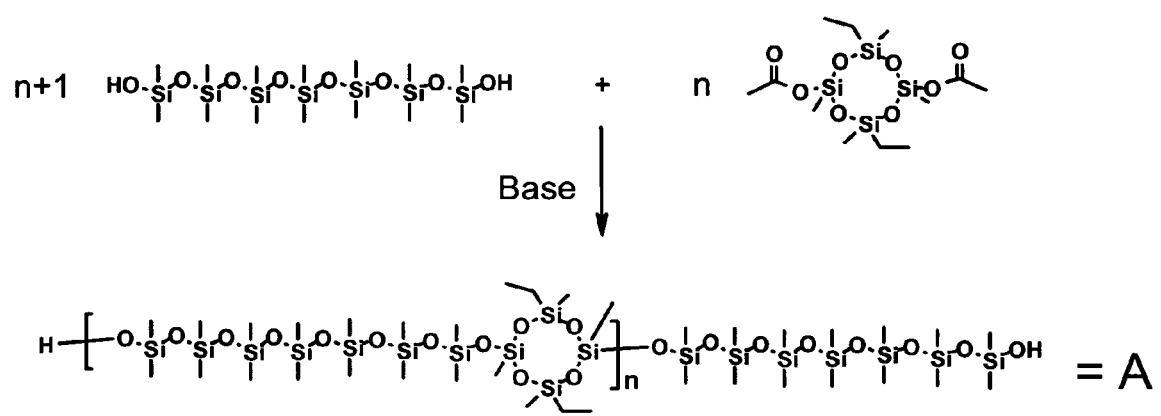
FIG. 3 is a reaction scheme illustrating one possible method, according to one embodiment of the present invention, by which to synthesize Crosslinking Agent "A"
Figure 4:
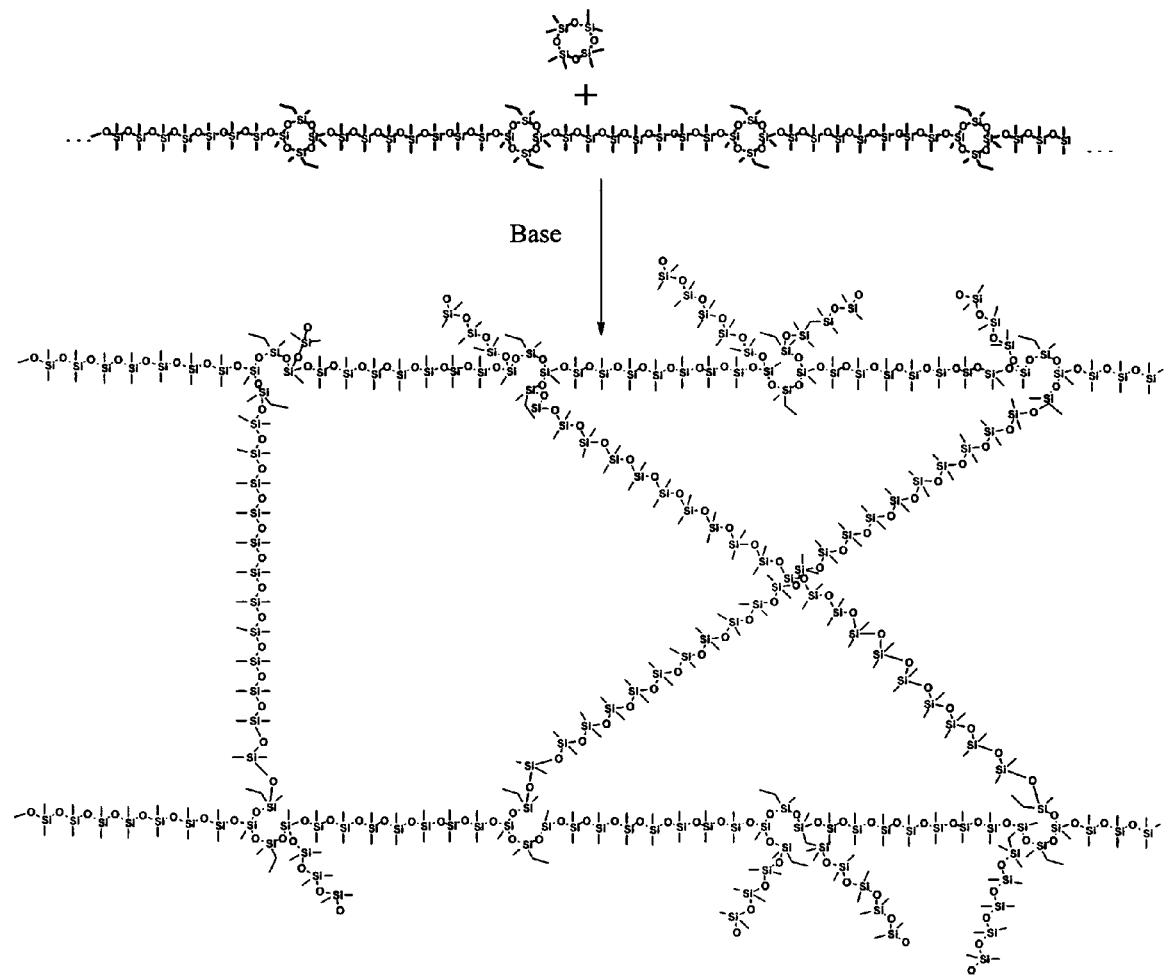
FIG. 4 is a reaction scheme illustrating the conversion of D4 to PDMS by base, and the mediation of the ring opening polymerization reaction by the SiO— end groups, according to one embodiment of the present invention.

One embodiment of the present invention is detailed in FIGS. 3 and 4. These Figures outline the preparation of a new multifunctional crosslinking agent poly(diethyltetramethylcyclotetrasiloxane-alt-polydimethylsiloxane) (see product "A" in FIG. 3), and the simultaneous polymerization and crosslinking of octamethylcyclotetrasiloxane (D4) monomer with Crosslinking Agent "A" forming new siloxane rubbers (FIG. 4). The two ingredients, the monomer D4 and the Crosslinking Agent "A", are compatible with each other in any proportion. The liquid monomer D4 may be regarded as a sacrificial solvent that provides a homogenous curing system.

The Crosslinking Agent "A" can be synthesized by co-condensation of diacetoxydiethyltetramethyl-cyclotetrasiloxane with silanol-terminated polydimethylsiloxane (HO—PDMS—OH) (see FIG. 3). The synthesis of Crosslinking Agent "A" is described in co-pending U.S. patent application Ser. No. 11/209,136, the disclosure of which is hereby incorporated by reference herein in its entirety. Crosslinking Agent "A" has the structure shown below:

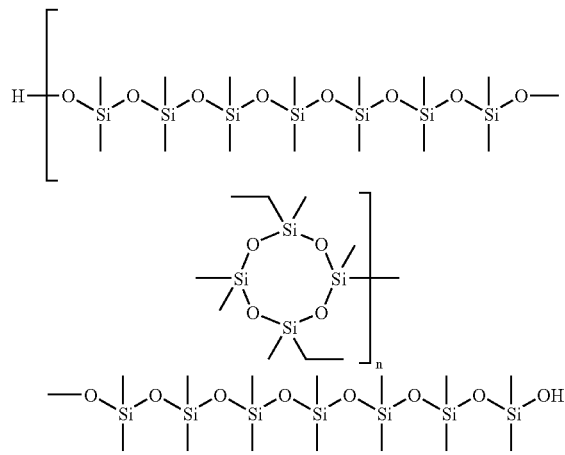

where n is an integer in the range of 1 to about 100. In another embodiment, n is an integer in the range of about 5 to about 75, or from about 10 to about 50, or from about 20 to about 40, or even from about 25 to about 35. Additionally, it should be noted that here, as well as elsewhere in the text, ranges may be combined.

Figure 1:
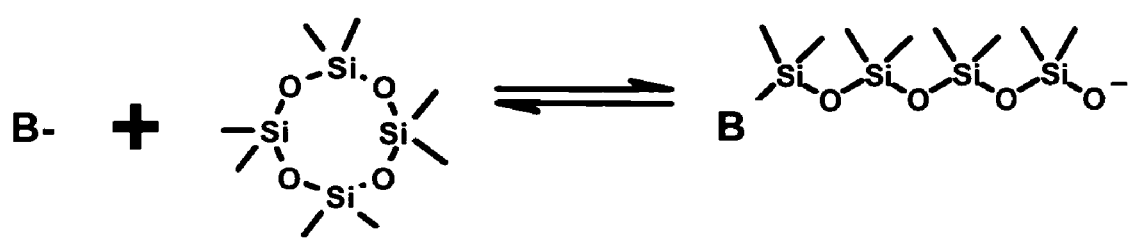
FIG. 1 is a reaction scheme illustrating the initiation of a polymerization reaction of D4 by a base B (e.g., —OH, —OR) to a PDMS prepolymer.
Figure 2:
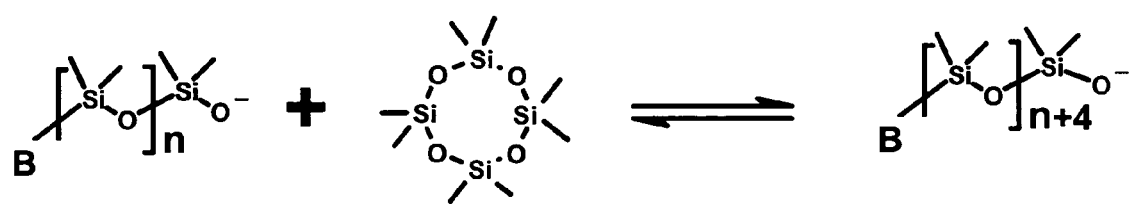
FIG. 2. is a reaction scheme illustrating a propagation reaction via repetitive ring opening steps in equilibrium with cyclization.

As outlined in FIG. 4, D4 is converted to PDMS by at least one base, and the ring opening polymerization is mediated by reactive SiO— end groups arising from the monomer shown in FIGS. 1 and 2. One advantage of the present invention is that in the presence of Crosslinking Agent "A", the propagating SiO— chain ends not only attack the rings present in D4 but also the rings present in Crosslinking Agent "A". In other words, there is a competition between the D4 monomer and the rings in Crosslinking Agent "A" for the active SiO— groups. The opening of the rings in Crosslinking Agent "A" can, and does, yield reactive SiO— groups which, in the presence of excess D4, effects the crosslinking of PDMS.

A base catalyst appears to offer the best cure resulting in the least amount of extractables; however, unless neutralized, the base may decompose the polysiloxane elastomer upon heating. To avoid this undesirable side reaction, the present invention utilizes a transient base (e.g., tetramethylammonium hydroxide). It should be noted that the present invention is not solely limited to the use of tetramethylammonium hydroxide as a transient base. Rather, any suitable transient base can be used herein and others suitable exemplary transient bases are discussed in detail below. Upon heating, transient bases decompose to neutral compounds (i.e., in the case of tetramethylammonium hydroxide to trimethyl amine and methyl alcohol).

In contrast to the prior art, Crosslinking Agent "A" differs in two fundamental regards. First, Crosslinking Agent "A" has a much higher functionality than that of previously utilized crosslinkers. The higher functionality tends to, in most circumstances, lead to faster siloxane network formation. Second, Crosslinking Agent "A" results in a uniquely stable network structure due to the nature of the junctions between crosslink points. Previously 1,2-bis-heptamethyl-cyclotetrasiloxanylethane was utilized as the crosslinker. 1,2-bis-heptamethylcyclotetrasiloxanylethane generates a crosslink via a —CH$_2$—CH$_2$— group. This linkage is relatively thermally weak and can cleave when the elastomer is subjected to elevated temperatures. In contrast, the network resulting from Crosslinking Agent "A" comprises silicon-oxygen linkages. Thus, the thermal stability of the siloxane elastomers of the present invention is/are thermally superior to those of the prior art.

In addition to D4, other monomers can be utilized in the present invention. These monomers include, but are not limited to, hexamethylcyclotrisiloxane, (D3), decamethylcyclopentasiloxane (D5), and dodecamethylcyclohexasiloxane (D6).

In another embodiment, monomers consistent with Formulas (I) through (IV) shown below can be utilized in conjunction with Crosslinking Agent "A" to yield crosslinked siloxane networks in accordance with the present invention. It should be noted that the present invention is not solely limited to the monomers shown below. Rather, it will be appreciated that other monomers can be used in conjunction with Crosslinking Agent "A" to yield crosslinked siloxane networks in accordance with the present invention.

$R^1R^2R^3R^4R^5R^6$-cyclotrisiloxane (I)

$R^1R^2R^3R^4R^5R^6R^7R^8$-cyclotetrasiloxane (II)

$R^1R^2R^3R^4R^5R^6R^7R^8R^9R^{10}$-cyclopentasiloxane (III)

$R^1R^2R^3R^4R^5R^6R^7R^8R^9R^{10}R^{11}R^{12}$-cyclohexasiloxane (IV)

wherein $R^1$ through $R^{12}$ are independently selected from methyl, ethyl, propyl, butyl, pentyl, and phenyl.

In another embodiment, each "R''''" can represent a variable substituent of the silicon atoms involved in the cyclosiloxanes indicated in each formula. Any "R''''" group may be bonded to any silicon atom of the cyclosiloxane ring. Each silicon atom of such ring has two "R''''" groups. Therefore the number of "R''''" groups is always twice the number of silicon atoms in such ring. Accordingly, cyclotrisiloxane has six "R''''" groups $R^1$ through $R^6$ as is shown above in Formula (I). Further, each "R''''" is independently chosen from among the six possibilities: methyl, ethyl, propyl, butyl, pentyl, and phenyl.

Suitable curing temperatures for curing the siloxane polymers according to the present invention include all temperatures within the range of about 0° C. to about 200° C. In another embodiment, suitable curing temperatures for the present invention include all temperatures within the range of about 25° C. to about 150° C., or from about 25° C. to about 130° C., or from about 50° C. to about 130° C., or even from about 80° C. to about 130° C. Additionally, it should be noted that here, as well as elsewhere in the text, ranges may be combined.

In addition to tetramethylammonium hydroxide, other transient bases suitable for use in conjunction with the present invention include, without limitation, quaternary ammonium bases having the general structure: N($R^aR^bR^cR^d$)OH, wherein $R^a$ through $R^d$ are independently selected from methyl, ethyl, propyl, butyl, pentyl, hexyl, heptyl, octyl, nonyl, decyl, and phenyl. Still other transient bases suitable for use in conjunction with the present invention include, without limitation, quaternary phosphonium bases having the general structure P($R^eR^fR^gR^h$)OH wherein $R^e$ through $R^h$ are independently selected from methyl, ethyl, propyl, n-butyl, pentyl, cyclcopentyl, cyclopentadienyl, hexyl, cyclohexyl, phenyl, heptyl, cycloheptyl, octyl, cyclooctyl, nonyl, and decyl. Still further quaternary phosphonium bases suitable for use in conjunction with the present invention include, without limitation, methyltriphenylphosphonium hydroxide, tetramethylphosphonium hydroxide, tetraethylphosphonium hydroxide, tetra-n-butylphosphonium hydroxide, and n-butyltricyclohexylphosphonium hydroxide.

Curing times consistent with the present invention depend upon physical parameters such as temperature and catalyst concentration. Curing times for the present invention generally range from about 1 to about 24 hours, or from about 4 hours to about 12 hours, or from about 6 hours to about 12 hours, or even from about 8 hours to about 12 hours.

In one embodiment, products resulting from the process of the present invention exhibit an extractable mass of from about 0% to about 44% by weight, or from about 4% to about 22%, or even from about 8% to about 22%.

In one embodiment, products resulting from the process of the present invention exhibit a percent elongation of up to about 5000%, or up to about 500%, or up to about 270%, or even up to about 170%.

In one embodiment, products resulting from the process of the present invention exhibit thermal stability up to about 600° C., or up to about 400° C., or up to about 380° C., or even up to about 315° C.

The following examples are presented for illustrative purposes only and are in no way meant to limit the scope of the present invention.

EXAMPLES

Example 1

In the present example Crosslinking Agent "A" comprises a PDMS component, HO—PDMS—OH, having a $M_n$ of about 416.3 g/mole. Crosslinking Agent "A" (0.075 g) is dissolved in monomer D4 (2.925 g). Tetramethylammonium hydroxide (0.01 g) is added to the mixture and the mixture is heated to about 80° C. After about 20 minutes the system is transferred to a fluoropolymer mold which is covered with a layer of aluminum foil and a sheet of rubber, and placed between two steel plates to prevent evaporation of D4. The system is heated for about 12 hours at about 110° C. Next, the temperature is increased to about 140° C. for about an additional two hours to decompose the catalyst. The polysiloxane elastomer recovered is a colorless, transparent flexible solid sheet, with an elongation of about 100%. A small amount of white particles, most likely due to a carbonate present in the catalyst, could be seen embedded in the rubber.

The elastomer is extracted with tetrahydrofuran (THF) three times at room temperature. Next, a small sample (about 0.10 g) is placed in about 20 mL THF and stirred for about 8 hours. The sample is dried and the weight of the THF extractable fraction is determined to be about 20.2%. The extractables appear to be of low molecular weight and are likely cyclics, as would be expected from an equilibrium polymerization.

Example 2

This sample is synthesized in an identical fashion to Example 1, however different ratios of starting materials are used: Crosslinking Agent "A" (0.15 g) is dissolved in D4 (2.85 g). The network recovered is similar in appearance to the network in Example 1, however its elongation is about 50%, and the extractables are about 14.5%.

Example 3

This sample is synthesized in an identical fashion to Example 1 except Crosslinking Agent "A" (0.3 g) is dissolved in D4 (2.7 g). This film appears to have less elongation than Example 2 (approximately 40%) and is somewhat brittle by comparison. The extractables for this siloxane elastomer are determined to be about 12%.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A process for preparing siloxane polymers comprising the steps of:
   (a) polymerizing at least one siloxane-based monomer in the presence of a crosslinking agent consistent with the following structure:

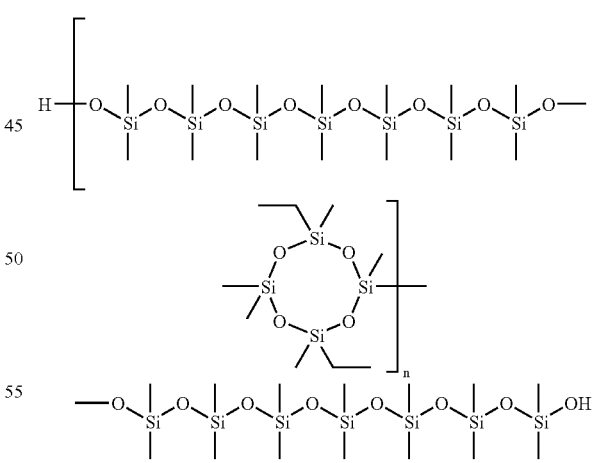

where n is an integer in the range of 1 to about 100; and
   (b) recovering at least one polymerization product generated by the reaction of step (a).

2. The process of claim 1, wherein the at least one monomer is selected from hexamethylcyclotrisiloxane, octamethylcyclotetrasiloxane decamethylcyclopentasiloxane, dodecamethylcyclohexasiloxane, or mixtures of two or more thereof.

3. The process of claim 1, wherein the at least one monomer is selected from one or more monomers having a structure consistent with one of the formulas shown below:

$R^1R^2R^3R^4R^5R^6$-cyclotrisiloxane (I)

$R^1R^2R^3R^4R^5R^6R^7R^8$-cyclotetrasiloxane (II)

$R^1R^2R^3R^4R^5R^6R^7R^8R^9R^{10}$-cyclopentasiloxane (III)

$R^1R^2R^3R^4R^5R^6R^7R^8R^9R^{10}R^{11}R^{12}$-cyclohexasiloxane (IV)

wherein $R^1$ through $R^{12}$ are independently selected from methyl, ethyl, propyl, butyl, pentyl, and phenyl.

4. The process of claim 1, wherein the amount of crosslinking agent used in polymerization reaction is greater than 0% by weight to less than about 100% by weight.

5. The process of claim 1, wherein the amount of the at least one monomer used in polymerization reaction is greater than 0% by weight to less than about 100% by weight.

6. The process of claim 1, wherein the product of the polymerization reaction of Step (a) is cured at a temperature in the range of about 0° C. to about 200° C.

7. The process of claim 6, wherein the product of the polymerization reaction of Step (a) is cured at a temperature in the range of about 25° C. to about 150° C.

8. The process of claim 7, wherein the product of the polymerization reaction of Step (a) is cured at a temperature in the range of about 25° C. to about 130° C.

9. The process of claim 8, wherein the product of the polymerization reaction of Step (a) is cured at a temperature in the range of about 50° C. to about 130° C.

10. The process of claim 8, wherein the product of the polymerization reaction of Step (a) is cured at a temperature in the range of about 80° C. to about 130° C.

11. The process of claim 1, wherein the polymerization reaction of Step (a) further includes at least one transient base.

12. The process of claim 11, wherein the at least one transient base is selected from quaternary ammonium hydroxides consistent with the formula $N(R^aR^bR^cR^d)OH$, wherein $R^a$ through $R^d$ are independently selected from methyl, ethyl, propyl, butyl, pentyl, hexyl, heptyl, octyl, nonyl, decyl, and phenyl.

13. The process of claim 11, wherein the at least one transient base is selected from quaternary phosphonium bases consistent with the formula $P(R^eR^fR^gR^h)OH$, wherein $R^e$ through $R^h$ are independently selected from methyl, ethyl, propyl, n-butyl, pentyl, cyclcopentyl, cyclopentadienyl, hexyl, cyclohexyl, phenyl, heptyl, cycloheptyl, octyl, cyclooctyl, nonyl, and decyl.

14. The process of claim 11, wherein the at least one transient base is selected from tetramethylammonium hydroxide, methyltriphenylphosphonium hydroxide, tetramethylphosphonium hydroxide, tetraethylphosphonium hydroxide, tetra-n-butylphosphonium hydroxide, n-butyltricyclohexylphosphonium hydroxide, and mixtures of two or more thereof.

15. The process of claim 1, wherein the polymerization product of Step (a) is subjected to curing for about 1 hour to about 24 hours prior to recovery in Step (b).

16. The process of claim 15, wherein the polymerization product of Step (a) is subjected to curing for about 4 hours to about 12 hours prior to recovery in Step (b).

17. The process of claim 16, wherein the polymerization product of Step (a) is subjected to curing for about 6 hours to about 12 hours prior to recovery in Step (b).

18. The process of claim 17, wherein the polymerization product of Step (a) is subjected to curing for about 8 hours to about 12 hours prior to recovery in Step (b).

19. A siloxane polymer product made by the process of claim 1.

20. A process for preparing siloxane polymers comprising the steps of:
(a) polymerizing at least one siloxane-based monomer in the presence of a crosslinking agent consistent with the following structure:

[structure diagram]

where n is an integer in the range of 1 to about 100, and at least one transient base, wherein the at least one monomer is octamethylcyclotetrasiloxane and the at least one transient base is tetramethylammonium hydroxide; and (b) recovering at least one polymerization product generated by the reaction of Step (a).

21. A siloxane polymer product made by the process of claim 20.

22. A process for preparing siloxane polymers comprising the steps of:
(a) polymerizing at least one siloxane-based monomer in the presence of a crosslinking agent consistent with the following structure:

[structure diagram]

where n is an integer in the range of 1 to about 100, and at least one transient base, wherein the at least one monomer is selected from one or more monomers having a structure consistent with one of the formulas shown below:

$R^1R^2R^3R^4R^5R^6$-cyclotrisiloxane (I)

$R^1R^2R^3R^4R^5R^6R^7R^8$-cyclotetrasiloxane (II)

$R^1R^2R^3R^4R^5R^6R^7R^8R^9R^{10}$-cyclopentasiloxane (III)

$R^1R^2R^3R^4R^5R^6R^7R^8R^9R^{10}R^{11}R^{12}$-cyclohexasiloxane (IV)

wherein $R^1$ through $R^{12}$ are independently selected from methyl, ethyl, propyl, butyl, pentyl, and phenyl; and (b) recovering at least one polymerization product generated by the reaction of Step (a).

23. A siloxane polymer product made by the process of claim 22.

\* \* \* \* \*